United States Patent [19]
Joyce

[11] 3,765,807
[45] Oct. 16, 1973

[54] DUMP TRUCK PUMP
[75] Inventor: Arthur B. Joyce, Corinth, Miss.
[73] Assignee: Tyrone Hydraulics, Inc., Corinth, Miss.
[22] Filed: Oct. 1, 1971
[21] Appl. No.: 185,709

[52] U.S. Cl. .................. 418/191, 251/294, 60/477, 60/DIG. 10
[51] Int. Cl. ............................................. F01c 1/08
[58] Field of Search .................. 60/52 HC, 52 HD, 60/52 HE, 52 US; 251/294; 418/191, 205

[56] References Cited
UNITED STATES PATENTS

| | | | |
|---|---|---|---|
| 2,095,286 | 10/1937 | Riach | 60/52 HE |
| 2,457,467 | 12/1948 | Hartman | 60/52 HC |
| 2,544,990 | 3/1951 | Harrington et al. | 60/52 HE |
| 2,568,052 | 9/1951 | Catranis | 251/294 X |
| 2,633,141 | 3/1953 | Russell | 251/294 X |

Primary Examiner—Edgar W. Geoghegan
Attorney—Synnestvedt & Lechner

[57] ABSTRACT

A dump truck pump is disclosed incorporating a hydraulic gear pump adapted to be controllably connected to the truck engine and further incorporating control valve means including a reciprocable piston type valve assembly working in a bore and provided with a cable type actuating element enclosed within a sheath and having means directly connecting the sheath to the body of the pump which means completely closes the valve bore and thus prevents exposure of the valve and bore to the elements. The other end of the valve bore is also enclosed and protected.

1 Claim, 6 Drawing Figures

INVENTOR
ARTHUR B. JOYCE

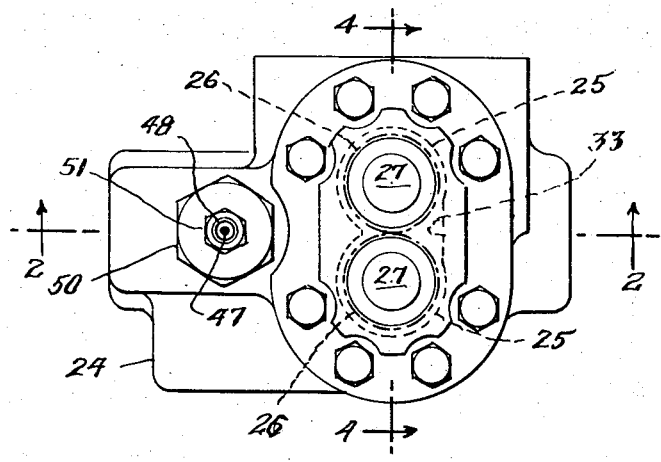
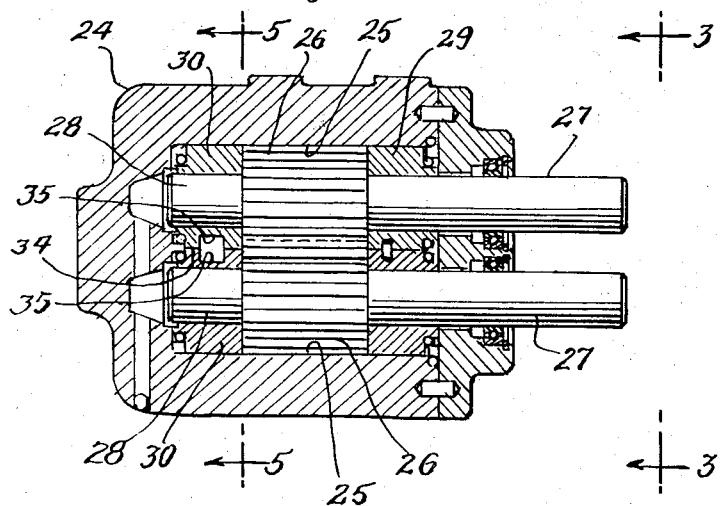
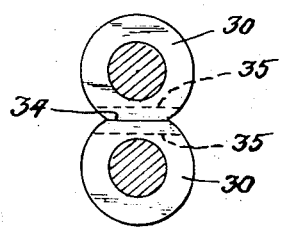
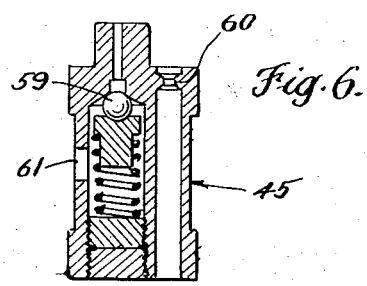

DUMP TRUCK PUMP

This invention relates to a dump truck pump and is especially concerned with a hydraulic pump arrangement in which the body or casing of the device incorporates a gear pump and also a control valve. The assembly is adapted to be mounted as a unit upon the frame or bed of the truck and serves to supply the pressure fluid to and also to control the action of the hydraulic cylinder employed to lift, hold and lower the dump truck body.

Devices of this general kind are well known and have been extensively used in a variety of trucks including not only ordinary dump trucks, but also dump trailers, hydraulic fifth wheels and similar equipment.

It is a general objective of the present invention to provide a dump truck pump adapted to these uses but having distinctive improvements as compared with prior devices employed for this purpose.

In typical prior devices the control valve is arranged to reciprocate in a bore having opposite ends opening through external faces of the casing or body of the unit. A control connection also is ordinarily extended for attachment to one end of the reciprocating valve mechanism, such control connection comprising either a control cable or suitable linkages adapted to be operated by a control knob or handle located in the cab of the truck. In this prior arrangement water, snow, ice and dirt had substantially free access to one or both ends of the valve bore and of the valve itself, in consequence of which the valve was frequently damaged.

It is an important objective of the present invention to provide a simple and yet effective arrangement for completely enclosing both ends of the valve bore, while providing a control connection to the valve itself extended through one of the bore closures.

It is also an object of the invention to simplify installation of the valve control mechanism.

The invention still further provides a simple and effective arrangement for enabling location of the necessary hydraulic connections at one side of the unit instead of at opposite sides thereof.

How the foregoing objects and advantages are attained, together with others which will occur to those skilled in the art, will be clear from the following description referring to the accompanying drawings, in which:

FIG. 3 is an elevational view of the unit taken in the direction indicated by the line 3—3 applied to FIG. 4;

FIG. 4 is a sectional view taken in a plane containing the axes of the two pump gears, as indicated by the line 4—4 applied to FIG. 3;

FIG. 5 is a sectional view of certain parts taken as indicated by the line 5—5 on FIG. 4; and FIG. 6 is a longitudinal sectional view through a relief valve shown in FIG. 2, FIG. 6 being on an enlarged scale.

Figure 1:
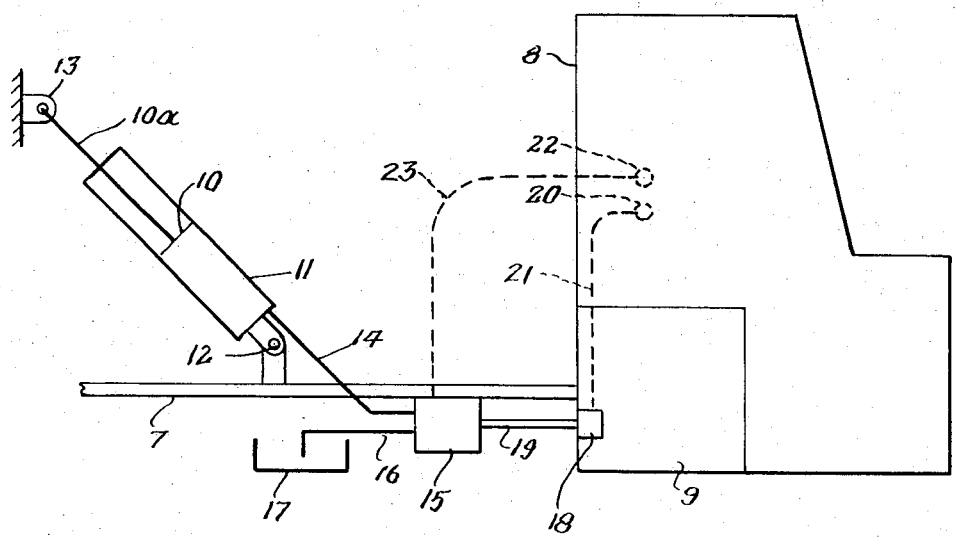
FIG. 1 is a diagram of the major components of a dump truck pump arrangement according to the present invention.

In the diagram of FIG. 1 the bed or frame of the truck is indicated at 7, the truck cab at 8, the engine at 9 and the piston and cylinder device for raising and lowering the truck body for dumping purposes at 10 and 11. The cylinder is anchored upon the bed, for instance by a pivot connection 12, and the piston rod 10a is connected with some mounting part such as indicated at 13 provided for this purpose on the truck body.

It will be clear that introduction of hydraulic liquid into the cylinder 11, for instance through the connection 14 will lift the truck body, and discharge of hydraulic liquid through the connection 14 will permit the truck body to descend by gravity.

The dump truck pump provided according to the present invention is indicated by the block 15 in FIG. 1, this unit having a connection 16 with the reservoir shown at 17. The pump in the unit 15 is adapted to be driven by a controllable clutch or transmission device indicated at 18 providing for controlled transmission of power from the engine 9 through the shaft 19 to the pump in the unit 15. This device is adapted to be controlled by the operator's knob or handle 20 in the cab 8 by means of the control connection 21.

Another control knob 22 has a flexible cable control connection 23 with the control valve in the unit 15, the arrangement of this control connection being described more fully hereinafter.

Figure 2:
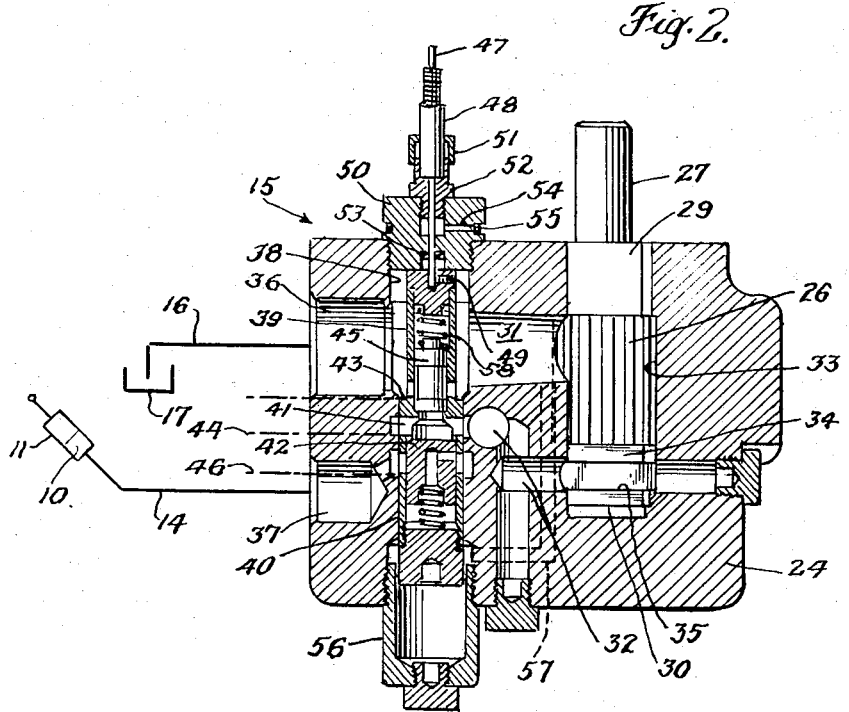
FIG. 2 is a transverse sectional view through the unit of the present invention, the section being taken in the plane of the axis of the valve bore as indicated by the section line 2—2 on FIG. 3.

Referring particularly to FIGS. 2, 3 and 4, the pump and control unit 15 comprises a body or casing 24. In this casing two cylindrical pump gear cavitites 25—25 are provided, these cavities being formed in intersecting or overlapping relation and serving to house the pump gears 26—26, each of which is provided with a mounting and driving shaft 27 at one end projecting from the casing for cooperation with driving means. The provision of a drive shaft connected with each gear provides for alternative use of one or the other shaft for driving purposes according to the direction of rotation of the transmission shaft, such as the shaft indicated at 19 in FIG. 1, for delivering power from the engine to the pump. At the opposite end of each pump gear a short mounting 28 is provided. The shafts 27—27 are received in bushings 29—29 and the shafts 28—28 are received in bushings 30—30, all four bushings being received in the cylindrical gear cavities in the casing and serving to journal the gears for rotation during operation of the pump.

As best seen in FIG. 2, the pumping cavity is provided with an inlet passage 31 and with an outlet passage 32, both of which are arranged at the same general side of the pumping cavity. The passage 31 communicates directly with the cavity, but the passage 32 is in communication with the opposite side of the pump through certain channels as described just below.

With the direction of rotation of the gears indicated by arrows in FIG. 3, the input side of the pump is at the left as viewed in FIGS. 2 and 3 and the output or pressure side of the pump is at the right. With the two individual cylindrical pump gear cavities intersecting or overlapping, a cusp is formed in the pumping cavity wall at the juncture of the two individual gear cavities, and by cutting away this cusp back to the line indicated in FIGS. 2 and 3 a channel 33 is provided extended axially of the gears at the pressure side. The channel 33 is placed in communication with the outlet passage 32 through another channel which is formed in the manner explained just below with particular reference to FIGS. 2, 4 and 5.

FIG. 5 illustrates the bushings 30—30 from one end thereof as indicated by section line 5—5 on FIG. 4. These bushings have flatted interengaging surfaces 34 and these flatted interengaging surfaces are provided with channels 35—35 cooperating to form a channel communicating at one end with the pressure channel 33 and at the other end with the outlet passage 32.

At the left as viewed in FIG. 2, the body or casing 24 is provided with a port 36 adapted to be connected with a reservoir such as indicated at 17 by means of the pipe 16, this pipe serving to supply the hydraulic fluid from the reservoir to the pump during raising of the truck body and serving to return the fluid from the dump cylinder during lowering of the truck body. Another port 37 is provided, this port being adapted to be connected by the pipe 14 with the cylinder 11 and serving for supply and discharge of the hydraulic liquid to and from the cylinder during operation.

A valve cavity is also provided in the casing of the unit, this cavity being formed as a bore 38 which extends across the device and the ends of which open through external surfaces of the casing at opposite sides. The passages and ports 31, 32, 36 and 37 all communicate with this valve bore and control of the flow is effected by means of the valve which is reciprocable in the bore.

The general arrangement of the valve is known and forms no part of the present invention per se. The valve and its operation are threfor only generally described herein.

The valve has a number of parts assembled into a unitary piston type structure. One end portion of the valve is indicated at 39 and the other end portion at 40. In the position of the valve shown in FIG. 2 the port 36 communicates with the passage 31 and thus supplies hydraulic fluid from the reservoir 17 to the pump. In this position the outlet or pressure passage 32 communicates with the interior chamber 41 of the valve which acts on the end of the check valve 42 mounted within the main valve body, displacing the check valve downwardly as viewed in FIG. 2 so that the pressure fluid may flow from the passage 32 through the chamber 41 to the outlet port 37 and thus deliver operating fluid to the cylinder 11.

When the shoulder 43 of the valve is moved downwardly as viewed in FIG. 2 to the position indicated by dash line 44, the valve will retain the fluid in cylinder 11 and thus hold the position of the truck body, and during this time the liquid pumped will flow through the relief valve 45 back to the inlet side of the pump and thus recirculate. When the shoulder 43 is moved downwardly to the position indicated by the dash line 46, the liquid in the cylinder 11 will be delivered back through the port 37 and into the reservoir, thereby permitting the body of the truck to descend by gravity.

The relief valve indicated generally at 45 in FIG. 2 is shown in axial section in FIG. 6. Since this is a known type of pilot operated relief valve, the construction and operation thereof is already known and forms no part of the invention per se. Therefore it need not be described in detail herein. It is mentioned, however, that the relief valve is axially movable as a whole against the action of the spring 58 and this will occur upon build up of pressure in the cavity 41. The pilot operated relief valve has a ball check 59 and a restricted passage 60.

When the relief valve as a whole moves upwardly the liquid may freely pass from the pressure side of the system into the interior of the relief valve and laterally through the port 61 then into the passages at the inlet side of the pump.

The control motions of the valve above described are effected by means of a control cable indicated generally in FIG. 1 at 23 and comprising a cable or wire 47 in a sheath 48, the cable 47 being fastened to the end portion of the valve by means of a set screw 49. Th cable 47 extends through a fitting 50 which plugs the open end of the valve bore and which serves to mount the adjacent end of the sheath 48. The end of the sheath is gripped by the lock or clamping device 51 which is provided at the upper end of the fitting 52 which in turn is secured in the central aperture of the fitting 50. In this way provision is made for attachement of the actuating cable to the valve itself and at the same time for the securing of the end of the sheath 48 to the pump unit, these attachments being effected in a manner which completely encloses the adjacent end of the valve bore, so that rain, snow, etc. will have no access to the valve bore or to the valve. An O-ring oil seal 53 is provided in the fitting 50 around the central control cable 47, and in the event of leakage past this O-ring seal, such leakage may readily discharge through the port 54 which is covered by an elastic band seal 55 acting as a simplified form of check or one way valve, and thereby preventing ingress of dirt.

At the opposite end of the valve bore a cap 56 is provided, this cap completely enclosing the adjacent end of the bore and thus completely shielding the adjacent end of the valve. It is contemplated that the system oil, i.e., the oil being pumped and controlled, will infill the interior of the cap 56 and the adjacent end of the valve bore, and in order to prevent undesired pressure fluctuations which might tend to restrain the axial motion of the valve structure, a passage 57 is provided, extending from the cavity in communication with the interior of the cap 56 to the inlet passage 31 of the pump. The pressure equalization provided in this way will avoid undesired impedance of the valve motions.

I claim:

1. Hydraulic equipment comprising a pump body having a pair of cylindrical cavities positioned in joining interrelationship, a pair of intermeshing pump gears in said cavities each gear having a mounting shaft projecting at each end of the gear, bushings on the shaft ends for mounting the shafts and thus the gears in the cavities, the bushings for the shafts at one end of the gears having flatted interengaging surfaces, pump inlet and outlet bores in the pump body positioned at the same side of the cavities, one of said bores being directly connected with the gear cavities, and passage means for connecting the opposite side of the cavities with the other bore, said passage means being formed in part by channels provided in the flatted surfaces of the bushings and in part by a channel provided by cutting away the cusp at the juncture of the cavities at the side thereof opposite to the inlet and outlet bores.

* * * * *